US010169164B1

(12) United States Patent
Chopra et al.

(10) Patent No.: US 10,169,164 B1
(45) Date of Patent: Jan. 1, 2019

(54) BACKUPS USING APPLICATION MAPS

(71) Applicant: EMC Corporation, Hopkinton, MA (US)

(72) Inventors: Shelesh Chopra, Bangalore (IN); Shilpa Mehta, New Dehli (IN); Asif Khan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 164 days.

(21) Appl. No.: 14/142,569

(22) Filed: Dec. 27, 2013

(51) Int. Cl.
G06F 17/30 (2006.01)
G06F 11/14 (2006.01)

(52) U.S. Cl.
CPC .................. G06F 11/1464 (2013.01)

(58) Field of Classification Search
CPC .......... G06F 11/1469; G06F 11/1451
USPC ....... 707/640, 654, 679, 602, 646, 638, 694, 707/744; 370/352
See application file for complete search history.

(56) References Cited

U.S. PATENT DOCUMENTS

| | | | | |
|---|---|---|---|---|
| 5,930,824 A * | 7/1999 | Anglin | ................ | G06F 11/1469 345/418 |
| 6,745,210 B1 * | 6/2004 | Scanlan | ............... | G06F 11/0727 |
| 7,130,870 B1 * | 10/2006 | Pecina | ................ | G06F 11/1433 |
| 7,197,489 B1 * | 3/2007 | Gauvin | ............... | H04L 41/0233 |
| 7,295,657 B1 * | 11/2007 | Keohane | .............. | H04L 12/581 370/352 |
| 7,631,068 B1 * | 12/2009 | Martins | ................ | G06F 11/328 370/363 |
| 7,685,269 B1 * | 3/2010 | Thrasher | ............... | G06F 9/4843 709/224 |
| 7,933,981 B1 * | 4/2011 | Cannon, III | ............ | H04L 41/12 709/220 |
| 7,966,293 B1 * | 6/2011 | Owara | ................ | G06F 11/1448 707/654 |
| 8,200,638 B1 * | 6/2012 | Zheng | ................ | G06F 11/1464 707/679 |
| 8,386,430 B1 * | 2/2013 | Myhill | ............... | G06F 11/1469 707/640 |
| 8,429,140 B1 * | 4/2013 | Lolayekar | ............... | G06F 17/30 707/694 |
| 8,478,864 B1 * | 7/2013 | Martins | ............... | G06F 11/1446 370/363 |
| 8,589,798 B2 * | 11/2013 | Prahlad | ............... | G06F 11/1458 707/654 |
| 8,943,441 B1 * | 1/2015 | Patrick | ................ | G06F 3/0484 345/440 |
| 9,069,774 B1 * | 6/2015 | Ansari | ................ | G06F 11/3006 |

(Continued)

Primary Examiner — Mariela Reyes
Assistant Examiner — Thong Vu
(74) Attorney, Agent, or Firm — Womble Bond Dickinson (US) LLP

(57) ABSTRACT

Methods and systems are described for generating graphical maps showing the backup degrees of data modules located across one or more client computers in a network, and directing backup and recovery operations for those data modules. According to one embodiment, the backup system sends information requests to the client computers, and receives in response the backup degrees of the data modules contained by the client computers. The backup system then generates and displays the graphical map. The backup system then can direct backup and recovery operations by sending operation requests to the client computers and updating the graphical map when necessary. Other embodiments are also described and claimed.

22 Claims, 8 Drawing Sheets

(56) References Cited

U.S. PATENT DOCUMENTS

| | | | | |
|---|---|---|---|---|
| 2003/0229549 | A1* | 12/2003 | Wolinsky | G06Q 30/0248 705/14.61 |
| 2005/0071390 | A1* | 3/2005 | Midgley | G06F 11/1451 |
| 2005/0144283 | A1* | 6/2005 | Fatula, Jr. | G06F 11/1464 709/226 |
| 2005/0267922 | A1* | 12/2005 | Nakajima | G06F 17/30244 |
| 2006/0123053 | A1* | 6/2006 | Scannell, Jr. | G06F 17/30035 |
| 2007/0043717 | A1* | 2/2007 | Arellanes | G06F 17/30882 |
| 2008/0133622 | A1* | 6/2008 | Brown | G06F 11/1458 |
| 2010/0241980 | A1* | 9/2010 | Sosnosky | G06F 3/0486 715/769 |
| 2010/0306171 | A1* | 12/2010 | Antos | G06F 11/1448 707/638 |
| 2011/0016089 | A1* | 1/2011 | Freedman | G06F 11/1451 707/640 |
| 2011/0131185 | A1* | 6/2011 | Kirshenbaum | G06F 11/1448 707/654 |
| 2011/0231361 | A1* | 9/2011 | Patchava | G06F 21/50 707/602 |
| 2011/0289057 | A1* | 11/2011 | Palagummi | G06F 11/1448 707/640 |
| 2012/0215904 | A1* | 8/2012 | Triantafillos | G06F 11/302 709/224 |
| 2013/0018946 | A1* | 1/2013 | Brown | G06F 11/1451 709/203 |
| 2013/0268493 | A1* | 10/2013 | Berman | G06F 11/1469 707/649 |
| 2014/0046903 | A1* | 2/2014 | Yin | H04W 8/30 707/644 |
| 2014/0201151 | A1* | 7/2014 | Kumarasamy | G06F 11/1469 707/646 |
| 2014/0258236 | A1* | 9/2014 | Vijayan | G06F 11/1448 707/639 |
| 2015/0205674 | A1* | 7/2015 | Schroth | G06F 11/1458 707/649 |

* cited by examiner

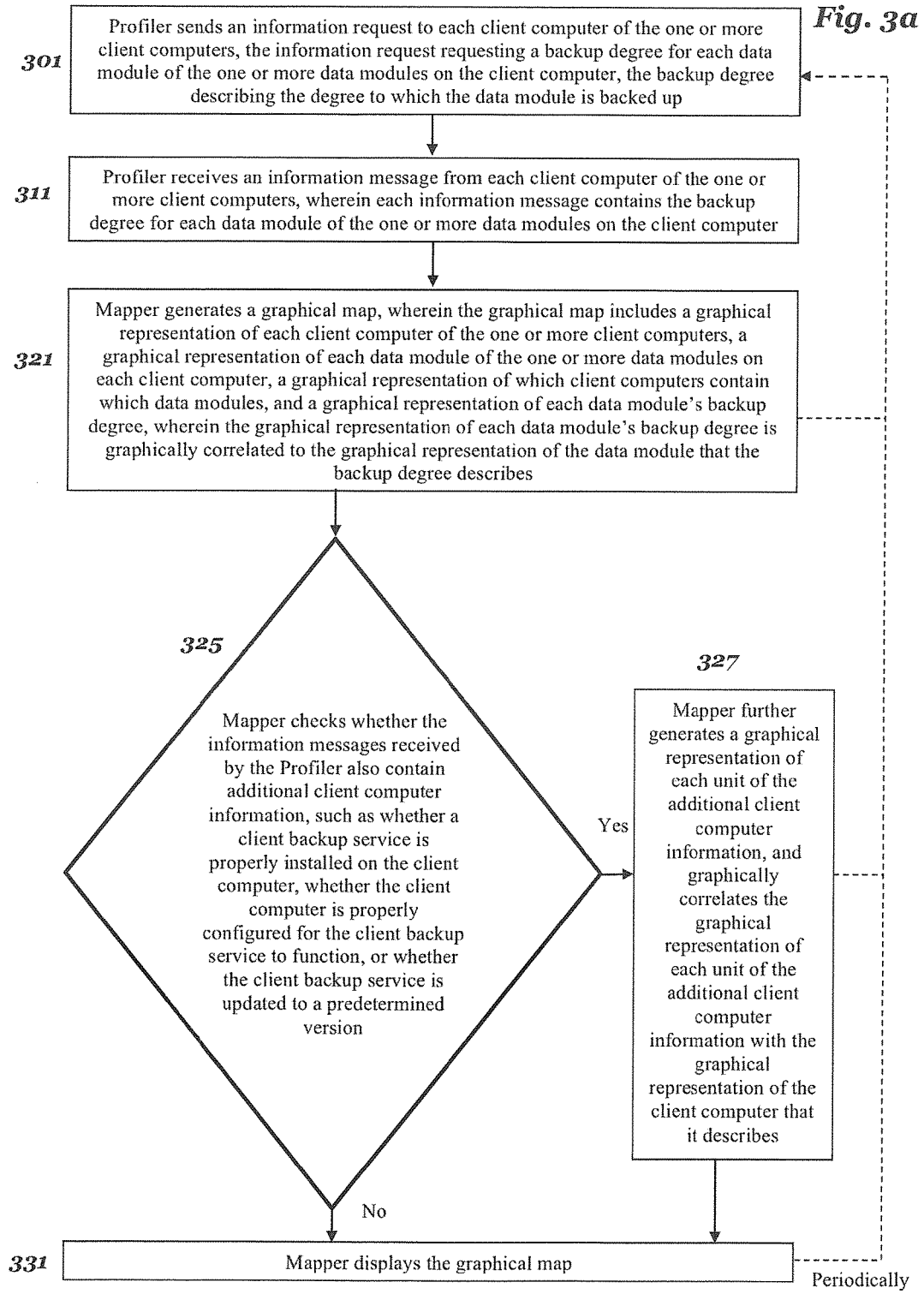

*Fig. 6a*

| Client Computer Name 601 | Data Module Name 603 | Backup Degree 605 |
|---|---|---|
| SQL Server Hostname | Config Database | 93% |
|  | Content Database | 2% |
| Web Front End 1 Hostname | Full machine Backup | 67% |
| Web Front End 2 Hostname | Search Index | 0% |
| Central Admin Hostname | Admin Service 1 | 100% |
|  | Admin Service 2 | 97% |

| | Additional Client Computer Information 631 | | | | |
|---|---|---|---|---|---|
| 611 Client Computer Name | 621 Client backup service properly installed? | 623 Client computer properly configured for client backup service to function? | 625 Client backup service version | 613 Data Module Name | 615 Backup Degree |
| SQL Server Hostname | Yes | Yes | 6.2 | Config Database | 93% |
|  |  |  |  | Content Database | 2% |
| Web Front End 1 Hostname | Yes | Yes | 5.9 | Full machine Backup | 67% |
| Web Front End 2 Hostname | No | No | NA | Search Index | 0% |
| Central Admin Hostname | Yes | Yes | 6.2 | Admin Service 1 | 100% |
|  |  |  |  | Admin Service 2 | 97% |

227

BACKUPS USING APPLICATION MAPS

FIELD OF THE INVENTION

Embodiments of the present invention relate generally to computer networks and computer backups. More particularly, embodiments of the invention relate to generating and displaying graphical maps of backup statuses, and directing backup and recovery operations from those graphical maps.

BACKGROUND

Organizations are increasingly deploying large networks and network-based applications to support internet and intranet technologies. These networks connect multiple machines, and often, many of these machines have multiple data modules that are important to the running of the network or the network-based application. A key benefit of adopting such large networks and network-based applications are scalability of resources, accessibility, and improved reliability of operations. It is often difficult, however, to use existing backup systems to view the configurations of all of the machines connected to the network, or to view the backup status of all of the data modules located on those machines.

One approach to viewing these configurations of multiple machines and the backup statuses of their data modules is to check the configuration of each machine individually, and the backup status of each data module on each machine individually. Handling the viewing of this information separately for each machine is resource intensive, difficult to perform concurrently, and becomes unwieldy from a management perspective as the number of machines in the network increases.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 3a is a flow chart of one embodiment of a process for the creation of a graphical map by the backup system.

FIG. 6a is one embodiment of the profile information store that does not include additional client computer information.

FIG. 6b is one embodiment of the profile information store that includes additional client computer information.

DETAILED DESCRIPTION

Figure 1:
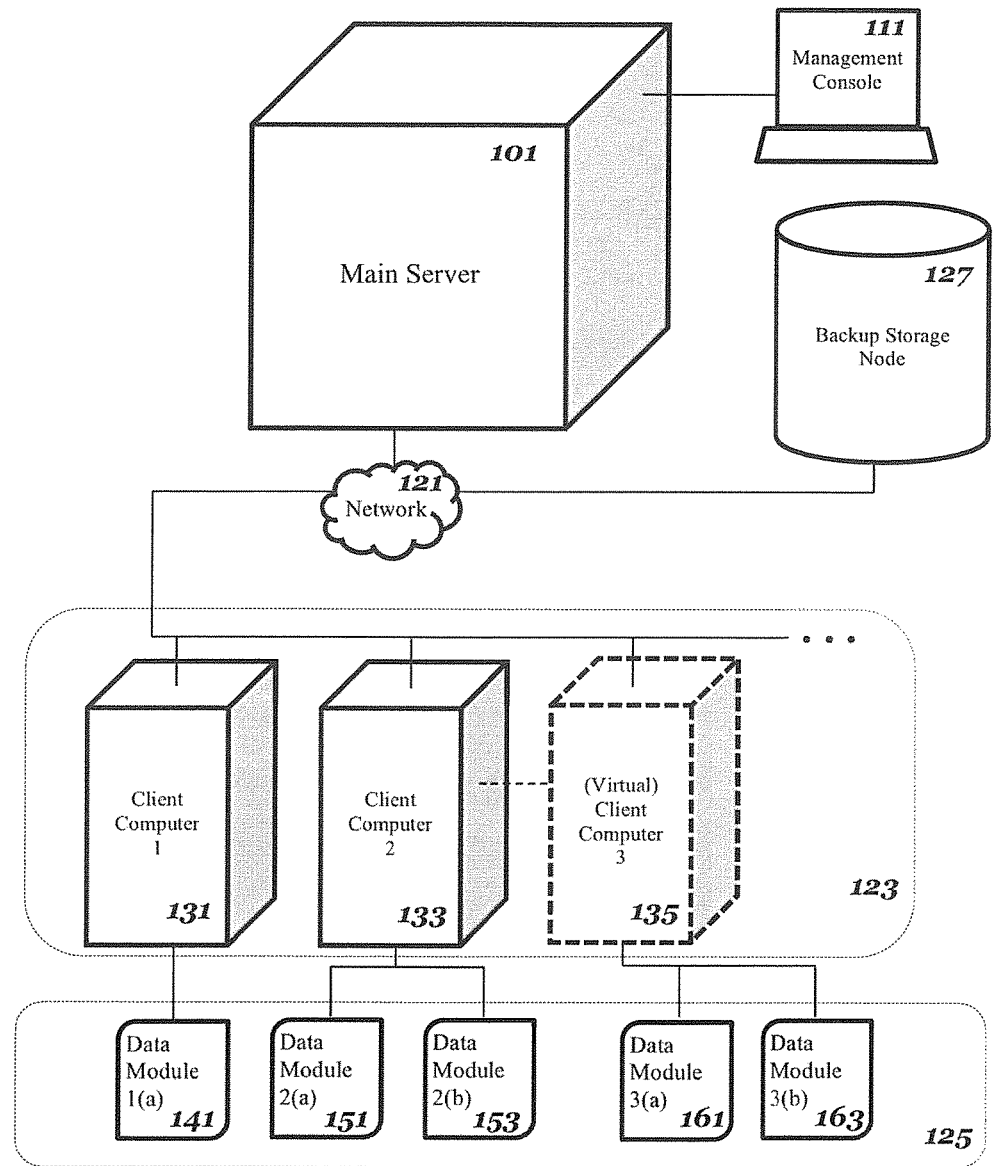
FIG. 1 is a diagram of one embodiment of a set of networked client computers to be backed up, and a backup system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various modifications and changes can be made to the embodiments without departing from the broader spirit and scope of the invention as set forth in the appended claims. The specification and drawings are, accordingly, to be regarded in an illustrative rather than a restrictive sense.

The embodiments can be implemented in numerous ways, including as a process, an apparatus, a system, a composition of matter, a computer readable medium such as a computer readable storage medium or a computer network wherein program instructions are sent over optical or communication links. A component such as a processor or a memory described as being configured to perform a task includes both a general component that is temporarily configured to perform the task at a given time or a specific component that is manufactured to perform the task. In general, the order of the steps of disclosed processes can be altered within the scope of the invention.

Reference in the specification to a "data module" means one or more data files or data file locations (such as file directories) stored on a client computer that have been collectively assigned a data module name. A data file can be any type of data file, such as a document file, an image file, an audio file, a video file, a multimedia file, a database or other data structure, a program source code file, an executable program file, a website front-end or back-end component file, a markup file, or any other type of data file that can be stored in a non-transitory computer readable medium.

Reference in the specification to "backup operations" or "backup and recovery operations" means a wide array of operations that can include but are not limited to backing up data or recovering backed up data. These terms can also refer, for example, to destructively rolling back to a previously backed up state, purging or deleting backups, editing a backup retention and expiration policy, cloning a backup, staging (cloning to another device) a backup, renaming or otherwise editing metadata for a backup, receiving or sending a report or notification relating to the status of a backup operation, searching for specific data, and searching for a specific backup. This list of possible backup operations is exemplary and not intended to be exhaustive.

The embodiments deal generally with grouping one or more data modules into a consistency group. The embodiments also deal generally with running a backup or recovery operation over all of the data modules in a consistency group.

FIG. 1 is a diagram of one embodiment of a set of networked client computers to be backed up, and a backup system. The embodiment of FIG. 1 illustrates a plurality of client computers 123. Each client computer of the set of client computers 123 can be any type of client computer, such as a server, a personal computer (e.g., desktops, laptops, and tablets), a virtual machine, a "thin" client, a personal digital assistant (PDA), a Web appliance, a gaming device, a media player, a mobile phone (e.g., Smartphone), or any other machine with similar capabilities. In FIG. 1, the client computers 123 are connected to a network 121. Network 121 can be any type of network, such as a local area network (LAN), a wide area network (WAN) such as Internet, a corporate intranet, a metropolitan area network (MAN), a storage area network (SAN), a bus, or a combination thereof, wired and/or wireless.

In addition to the client computers 123, the network 121 is also shown to connect to main server 101 and storage node 127. In other embodiments, the network 121 can be connected to other systems as well.

The embodiment of FIG. 1 illustrates the main server 101 as connected to the network 121. The main server 101 can be any type of device, such as a server, a personal computer (e.g., desktops, laptops, and tablets), a virtual machine, a "thin" client, a personal digital assistant (PDA), a Web appliance, a gaming device, a media player, a mobile phone (e.g., Smartphone), or any other machine with similar capabilities. In some embodiments, the main server 101 executes a profiler 221 to send requests to and receives information messages from client computers 123. This is diagrammed further in FIG. 2 and FIG. 3a. In some embodiments, the main server 101 executes a backup system 213. Embodiments of the main server 101 are described in more detail in reference to FIG. 2.

The embodiment of FIG. 1 illustrates the management console 111 as connected to the main server 101. The management console 111 is a component that is capable of displaying an output from a user, and can also be capable of receiving an input from a user. In some embodiments, inputs can be gathered through a user interface. In some embodiments, the management console 111 is the origin of requests to direct backup and recovery operations over one or more data modules (as described in FIG. 3b). In some embodiments, the management console 111 is where the graphical map 401 is displayed (as described in Block 331 of FIG. 3a and as illustrated in FIGS. 4a-4d and FIGS. 5a-5b). In FIG. 1, the management console 111 is connected to the main server 101. This connection can be through any type of network such as a local area network (LAN), a wide area network (WAN) such as Internet, a corporate intranet, a metropolitan area network (MAN), a storage area network (SAN), a bus, or a combination thereof, wired and/or wireless. In one embodiment, the management console 111 is connected to the main server 101 through the network 121.

The management console 111 can be any type of device, such as a server, a personal computer (e.g., desktops, laptops, and tablets), a virtual machine, a "thin" client, a personal digital assistant (PDA), a Web appliance, a file server, a gaming device, a network device, a media player, a mobile phone (e.g., Smartphone), or any other machine with similar capabilities. In one embodiment, the management console 111 is not a separate machine from the main server 101, but instead is simply one or more hardware components of the main server that are configured to direct input into the main server 101 and/or display output from the main server 101. These components can include, but are not limited to, a keyboard, a virtual keyboard, a mouse, a touchpad, a tilt wheel, a scroll ball, a trackball, a pointing stick, a joystick, a wheel, one or more physical switches, a touchscreen, computer monitor, a television screen, a touch screen, tactile electronic display, a Braille screen, a Cathode ray tube (CRT), a Storage tube, a Bistable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, a Head-mounted display, a punchcard, a printer, any other input or output device, or any combination thereof.

In another alternate embodiment, the input capabilities of the management console 111 are entirely non-existant. In this embodiment and in other embodiments, the origin of requests to direct backup and recovery operations over one or more data modules (as described in FIG. 3b) can instead be one of the client computers 123 or an automated scheduling software or hardware unit within the main console 101.

The embodiment of FIG. 1 also illustrates the backup storage node 127 as connected to the network 121. The backup storage node 127 is where the backups created by the processes described in the present invention are stored. Backup storage node 127 can be a storage server used for any of various different purposes, such as to provide multiple users with access to shared data and/or to back up mission critical data. Backup storage node 127 can be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Backup storage node 127 can have a distributed architecture, or all of its components can be integrated into a single unit. Backup storage node 127 can be implemented as part of an archive and/or backup storage system such as a de-duplication storage system available from EMC® Corporation of Hopkinton, Mass.

The machine or machines that make up backup storage node 127 can include one or more storage or memory units, including hard disk drives, optical drives, tape drives, random access memory (RAM), read-only memory (ROM), programmable read-only memory (PROM), Redundant Arrays of Independent Disks (RAID), flash memory, magneto-optical memory, holographic memory, memristor-based memory, bubble memory, magnetic drum, memory stick, Mylar® tape, smartdisk, thin film memory, zip drive, or similar storage or memory hardware.

The backup storage node 127 can include hardware or software modules that conduct backup functions such as deduplication. In one embodiment, backup storage node 127 can include a deduplication storage module that is configured to segment a data file to be stored in the backup storage node 127 into multiple segments according to a variety of segmentation policies or rules. Such a deduplication storage module can be a hardware or software module, and is configured to stores a segment in a storage unit if the segment has not been previously stored in the storage unit. Data stored in the storage units can be stored in a compressed form (e.g., lossless compression: Huffman coding, Lempel-Ziv Welch coding; delta encoding: a reference to a segment plus a difference; subsegmenting: a list of subsegments or references to subsegments, etc.). Different storage units within the backup storage node 127 can use different compression methods (e.g., main or active storage unit from other storage units, one storage unit from another storage unit, etc.).

In another alternate embodiment, the backup storage node 127 can be a cloud computing network storage system. In another alternate embodiment, the backup storage node 127 can not exist as a separate machine or set of machines connected via the network 121, but the backups can instead be stored on a storage unit located on the main server 101, on the management console 111, or on the client machines 123.

The embodiment of FIG. 1 illustrates that each of the data modules 125 are located on one of the clients 123. For a data module to be "located on" or "contained on" a client means that that the data module consists of one or more data files or data file locations (such as file directories) stored on that particular client computer that have been collectively assigned a data module name. The data module name and the information about which data files or data file locations it corresponds to on that client computer can be stored on the client computer as well, in one embodiment. In another embodiment, this information can instead be stored on the main server 101. In particular, FIG. 6*a* and FIG. 6*b* illustrate embodiments in which this information is stored through the profiler 221 in a profile information store 227, described in further detail in reference to FIG. 2. In another embodiment, this information can be stored on the management console 11*l*, on the backup storage node 127, or on another machine connected to the network 121 that is not pictured in FIG. 1.

In the embodiment of FIG. 1, the following data module assignments are illustrated. Data module 1(*a*) 141 is located on client computer 1 131, Data module 2(*a*) 151 and Data module 2(*b*) 153 are both located on client computer 2 133, Data module 3(*a*) 161 and Data module 3(*b*) 163 are both located on virtual client computer 3 135.

The client computers 123 can be physical computers, such as physical client computer 1 131 and client computer 2 133. Alternately, the client computers 123 can be virtual machines, such as virtual client computer 135. Alternately, the client computers 123 can be a collection of client computers including both physical client computers and virtual client computers, as illustrated in FIG. 1.

Not every client computer in the network must contain a data module, though each of the client computers 123 illustrated in the embodiment of FIG. 1 are illustrated as containing at least one. In an alternate embodiment, a client computer can exist that does not have a data module. A client computer can also have more than one data module. For example, physical client computer 2 133 is depicted as containing both data module 2(*a*) 151 and data module 2(*b*) 153; similarly, virtual client computer 3 135 is depicted as containing both data module 3(*a*) 161 and data module 3(*b*) 163. In the case of virtual client computers, both the virtual client computer and the physical client computer that it is run from can have their own separate data modules. For instance, virtual client computer 3 135 contains two data modules, and is illustrated as being run from physical client computer 2 133, which itself contains two data modules.

In one embodiment, the client computers 123 can be collection of servers that work in concert to support an application that runs on the Internet or that runs on an intranet. For example, the application could be an application based on Sharepoint, Oracle, VDI, SAP, Exchange, SQL server, or similar applications. Each client computer of the client computers 123 can have a particular function in supporting this application, such as an SQL server, a web front-end server, a central administration server, an index server, a database server, an application server, a gateway server, a broker server, an active directory server, a terminal server, a virtualization services server, a virtualized server, a file server, a print server, an email server, a security server, a connection server, a search server, a license server, any other machine with similar functionality, or any combination thereof. The client computers 123 can also include machines other than those listed.

Each client computer of the client computers 123 can store any form of data files and can run any form of application that may need to be backed up. The data modules of the client computers can include any type of data file, such as a database (such as a configuration database, a content database, a search database, etc.) or other data structure, a program source code file, an executable program file, an application service (such as a web application service, a search service, a central admin service, a managed metadata service, a state service, a usage and health service, a user profile service, a web analytics service, a performance service, a workflow service, etc.), a website front-end or back-end component file, a markup file, a configuration file, or any other type of data file. As previously noted, the data file can also be a document file, an image file, an audio file, a video file, a multimedia file, or any other type of data file that can be stored in a non-transitory computer readable medium. The data module can also be a full machine backup, as illustrated in data module 441 of FIGS. 4*a*, 4*b*, 4*c*, 4*d*, 5*a*, and 5*b*.

Figure 2:
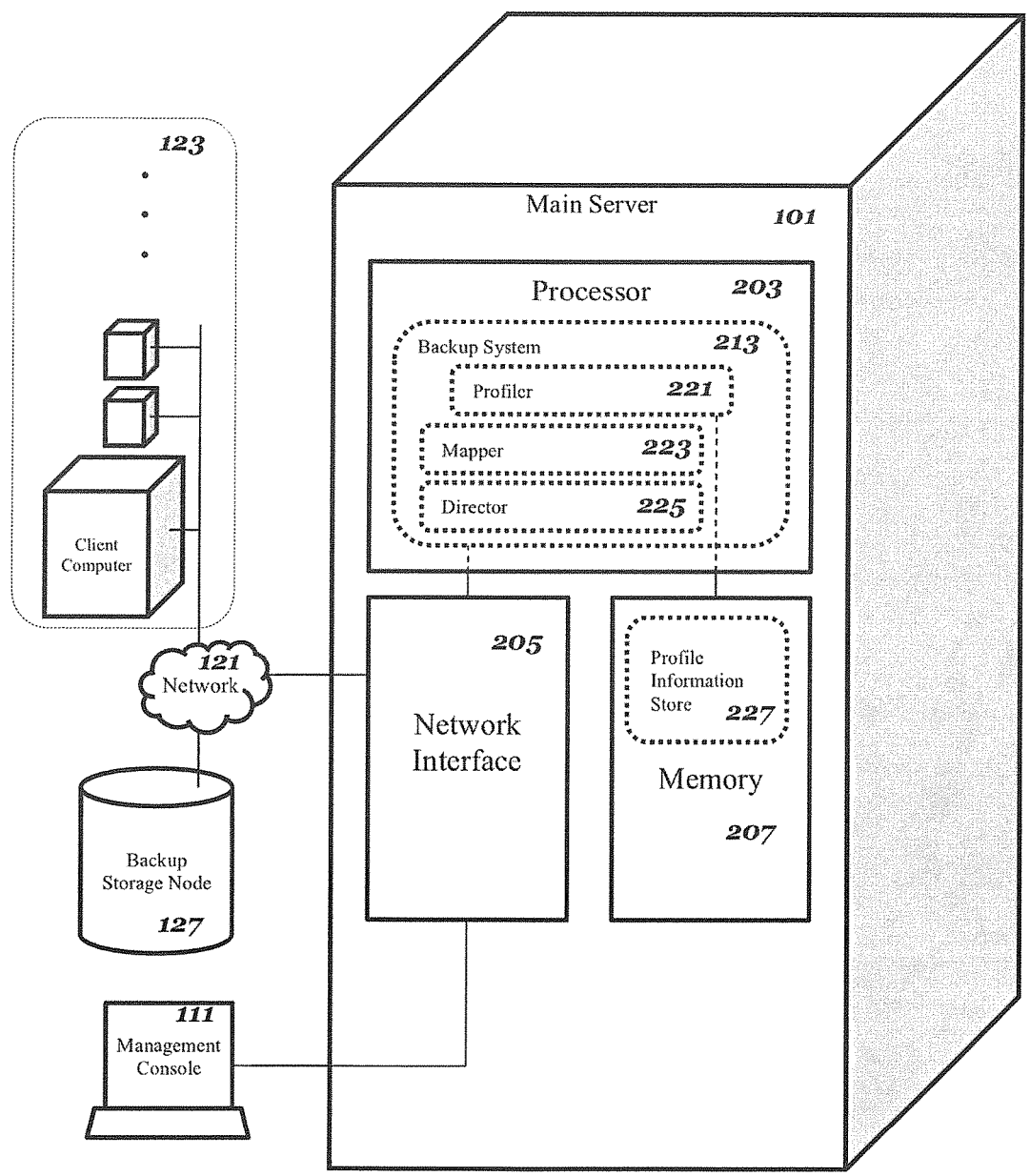
FIG. 2 is a diagram of one embodiment of the main server.

FIG. 2 is a diagram of one embodiment of the main server 101. The main server includes, but is not limited to, a network interface 205, a memory 207, and a processor 203 that is coupled to the network interface 205 and the memory 207. In alternate embodiments, the main server 101 can contain other hardware components as well.

The network interface 205 can be a wired interface (such as a bus or port), a wireless interface, or a combination of the two. The network interface 205 is configured at least to connect to the network 121. In other embodiments, the network interface 205 can be configured to connect to other networks as well.

The memory 207 can include one or more storage or memory units, including hard disk drives, optical drives, tape drives, random access memory (RAM), read-only memory (ROM), programmable read-only memory (PROM), Redundant Arrays of Independent Disks (RAID), flash memory, magneto-optical memory, holographic memory, memristor-based memory, bubble memory, magnetic drum, memory stick, Mylar® tape, smartdisk, thin film memory, zip drive, or similar storage or memory hardware.

In one embodiment, the processor 203 can be configured to execute a backup system 213. In one embodiment, the backup system 213 is a centralized backup software system, such as the NetWorker® software available from EMC® Corporation of Hopkinton, Mass. The backup system 213 can alternately be a centralized file-viewing or file-mapping system. The backup system 213 is capable of interacting with the network interface 205. In one embodiment, the backup system 213 is also capable of interacting with the management console 111 directly. In some embodiments, the backup system 213 is not executed from the main server 101. For instance, the backup system 213 can be executed from management console 111, the backup storage node 127, or one of the client computers 123.

In some embodiments, the backup system 213 includes or interfaces with a profiler 221. The profiler 221 is configured to gather data about the client computers 123 and their data modules 125. In one embodiment, the profiler 221 is configured to send information requests to client computers 123 requesting backup degree regarding their data modules, and is further configured to receive information messages from the client computers containing that backup degree. This process is described in more detail in blocks 301 and 311 of FIG. 3a. In some embodiments, the profiler 221 then periodically polls the client computers 123 for changes in set of client computers 123, such as the addition or removal of a client computer from the network, or for changes in the set of data modules 125, such as the creation, movement, editing, or deletion of a data module.

In some embodiments, the profiler 221 includes or interfaces with a profile information store 227. The profiler 221 uses the profile information store 227 to store information that the profiler 221 gathers from the information messages described in Block 311 of FIG. 3a, which for each data module includes at least a data module name, the backup degree relating to the data module identified by the data module name, and the client computer name identifying the client computer on which the data module identified by the data module name is located. One embodiment of this is depicted in FIG. 6a. In some embodiments, the profiler 221 also gathers additional client computer information from these information messages, and also stores it in the profile information store 227. One embodiment of the profile information store 227 including this information is depicted in FIG. 6b, with the additional client computer information located under column 631.

The profile information store 227 can be a database, a table, a list, a matrix, an array, an arraylist, a tree, a hash, a flat file, an image, a queue, a heap, a memory, a stack, a set of registers, or any data structure that can hold data about one or more entities. Two embodiments of the profile information store 227 are provided in FIG. 6a and FIG. 6b.

In some embodiments, the profile information store 227 is stored in the memory 207, or some other storage unit, of the main server 101. In other embodiments, the consistency group information store 227 is not located on the main server 101. For instance, the profile information store 227 can be located on the management console 111, the backup storage node 127, or one of the client computers 123. In some embodiments, the consistency group manager 223 and the consistency group information store 227 are not located on the same machine.

In some embodiments, the backup system 213 includes or interfaces with a mapper 223. The mapper 223 is configured to generate a graphical map 401 of the data gathered by the profiler 221. In one embodiment, the graphical map 401 includes a graphical representation of each client computer of the one or more client computers, a graphical representation of each data module of the one or more data modules on each client computer, a graphical representation of which client computers contain which data modules, and a graphical representation of each data module's backup degree, wherein the graphical representation of each data module's backup degree is graphically correlated to the graphical representation of the data module that the backup degree describes. This process is described in more detail in Block 321 of FIG. 3a. In some embodiments, the mapper 223 is also configured to graphically correlate a graphical representation of additional client computer information gathered by the profiler 221 to the graphical representation of the client computer. In some embodiments, the mapper 223 periodically updates the graphical map 401 if the profiler 221 detects a change in the client computers 123 or the data modules 125, or if the director 225 completes an operation that changes the backup degree for one or more of the data modules 125.

In some embodiments, the backup system 213 includes or interfaces with a director 225. The director 225 is configured to direct a backup or recovery operation over one or more of the data modules 125. In one embodiment, the director 225 operates by receiving an incoming operation request indicating that one of the data modules is to be backed up to a predetermined degree, and sending a data module operation request to the client computer containing the data module, the data module operation request indicating that the data module is to be backed up to the predetermined degree. This process is described in more detail in FIG. 3b. In some embodiments, the mapper 223 is configured to then update the graphical map 401 to reflect the changed backup degree of the data module, as described in Block 371 of FIG. 3b. Further, in some embodiments, the director 225 can receive the incoming operation request for every data module contained on all of the one or more client computers connected to the network that is not backed up to the predetermined degree, as in Block 381 of FIG. 3b.

In some embodiments, the profiler 221, mapper 223, and director 225 are executed from the processor 203 of the main server 101. In other embodiments, at least one of these is not executed from the main server 101. For instance, at least one of these can be executed from management console 111, the backup storage node 127, or one of the client computers 123. In some embodiments, the backup system 213 is executed from a separate machine than one or more of the profiler 221, mapper 223, and director 225 is executed from. In some embodiments, all or some of the profiler 221, mapper 223, and director 225 can be executed on different machines.

FIG. 3a is a flow chart of one embodiment of a process for the creation of a graphical map 401 by the backup system 213. The graphical map creation process begins with the profiler 221 sending an information request to each client computer of the one or more client computers 123, the information request requesting a backup degree for each data module of the one or more data modules on the client computer, the backup degree describing the degree to which the data module is backed up (Block 301). In some embodiments (not illustrated in FIG. 3a), the profiler 221's information request also requests additional client computer information from the client computers 123. The additional client computer information can include, but is not limited to, information regarding one of whether a client backup service is properly installed on the client computer, whether the client computer is properly configured for the client backup service to function, or whether the client backup service is updated to a predetermined version.

The client backup service can be a software or hardware module executed by one or more of the client computers 123. This client backup service can any software or hardware module that allows a client to perform a backup or recovery operation over one or more of the data modules that it contains. In one embodiment, the client backup service can be a NetWorker® Application Module (such as the NetWorker® Module for Microsoft® Applications, the NetWorker® Module for Databases and Applications, the NetWorker® Module for SAP®, or the NetWorker® Module for MediTech®) available from EMC® Corporation of Hopkinton, Mass. In another embodiment, the client backup service can be any software or hardware module with similar functionality. In some embodiments, the client backup service can be executed from a different machine, such as the main server 101, the management console 111, or the backup storage node 127, so long as it is still capable of performing backup and recovery operations over data modules located on one or more of the client computers 123.

The graphical map creation process continues when the profiler 221 receives an information message from each client computer of the one or more client computers 123, wherein each information message contains the backup degree for each data module of the one or more data modules on the client computer (Block 311). The profiler 221 then uses the profile information store 227 to store information that the profiler 221 gathers from the information messages described in Block 311 of FIG. 3a, which for each data module includes at least a data module name, the backup degree relating to the data module identified by the data module name, and the client computer name identifying the client computer on which the data module identified by the data module name is located. One embodiment of this is depicted in FIG. 6a.

As previously noted, in some embodiments, the profiler 221 also gathers additional client computer information from these information messages, and also stores it in the profile information store 227. One embodiment of the profile information store 227 including this information is depicted in FIG. 6b, with the additional client computer information located under column 631. The additional client computer information can include, but is not limited to, information regarding one of whether a client backup service is properly installed on the client computer, whether the client computer is properly configured for the client backup service to function, or whether the client backup service is updated to a predetermined version.

The graphical map creation process continues when the mapper 223 generates a graphical map 401, wherein the graphical map 401 includes a graphical representation of each client computer of the one or more client computers 123, a graphical representation of each data module of the one or more data modules on each client computer, a graphical representation of which client computers contain which data modules, and a graphical representation of each data module's backup degree, wherein the graphical representation of each data module's backup degree is graphically correlated to the graphical representation of the data module that the backup degree describes (Block 321). Several embodiments of such a graphical map 401 are illustrated in FIGS. 4a, 4b, 4c, and 4d. The graphical representation of each data module's backup degree can take many forms, including, but not limited to, a percentage number, a pie chart, a color along a spectrum of colors, a bar graph, a rating along a predetermined minimum and maximum rating continuum, text, or any other numerical or graphical representation of the degree to which the corresponding data module is backed up. Several embodiments of such graphical representations of the backup degree are illustrated in FIGS. 4a, 4b, 4c, and 4d.

For the graphical representation of each data module's backup degree to be "graphically correlated" to the graphical representation of the data module means that a correlation between the two graphical representations can be logically inferred based on a graphical orientation of the two graphical representations with respect to each other. For instance, the graphical correlation can be that the graphical representation of each data module's backup degree is overlaid over the graphical representation of each data module, as illustrated in FIGS. 4a, 4b, 4c, 4d, 5a, and 5b. In other embodiments (not illustrated in figures), this graphical correlation can take the form of one graphical representation displayed next to the other graphical representation, a line or arrow or shape linking the two graphical representations, a footnote or footnote-like icon linking one graphical representation to another that is displayed elsewhere, text denoting a correlation between one graphical representation and the other, or any other graphical manner of correlating one graphical representation with another graphical representation.

In some embodiments, the graphical map creation process continues when the mapper 223 checks whether the information messages received by the Profiler also contain additional client computer information, such as whether a client backup service is properly installed on the client computer, whether the client computer is properly configured for the client backup service to function, or whether the client backup service is updated to a predetermined version (Block 325). If the information messages do not contain additional client computer information, then the mapper 223 continues with the process to Block 331.

If information messages do contain additional client computer information, then the mapper 223 further generates a graphical representation of each unit of the additional client computer information, and graphically correlates the graphical representation of each unit of the additional client computer information with the graphical representation of the client computer that it describes (Block 327). The graphical representation of each unit of the additional client computer information can take many forms, including, but not limited to, a percentage number, a pie chart, a color along a spectrum of colors, a bar graph, a rating along a predetermined minimum and maximum rating continuum, text, a modification of links between graphical representations in the existing graphical map 401, or any other possible numerical or graphical representations of additional server information. Several embodiments of such graphical representations of the additional client computer information of the backup degree are illustrated in FIGS. 5a and 5b. In other embodiments, the graphical representations of the additional client computer information can take forms more similar the graphical representations of the backup degrees illustrated in FIGS. 4a, 4b, 4c, and 4d, or can take other forms not listed here that would reasonably convey the additional client computer information in the context of the graphical map 401.

The graphical map creation process continues when the mapper 223 displays the graphical map 401 (Block 331). In one embodiment, this occurs by the mapper 223 sending the generated graphical map 401 to the management console 111, where the map is displayed on or through the management console Ill's output hardware. In another embodiment, the mapper 223 can instead display the graphical map 401 on or through output hardware of the main server 101, the backup storage node 127, or one of the client computers 123. In another embodiment, the mapper 223 does not display the graphical map 401 at all.

In some embodiments, the graphical map creation process "restarts" periodically. This means that once the mapper 223 generates and/or displays the graphical map 401, the profiler 221 can periodically send the same information requests, or slightly different information requests, to see if any changes have occurred to any of the client computers 123 or data modules 125, or to see if any client computers or data modules have been added or removed (Block 301). The profiler 221 can once again store any changes by modifying the existing data in the profile information store 227 (Block 311). The mapper 223 can then generate an updated graphical map 401 incorporating any changes noted by the profiler 221 (Block 321). The mapper 223 can then display the updated graphical map 401 (Block 331).

Figure 3B:
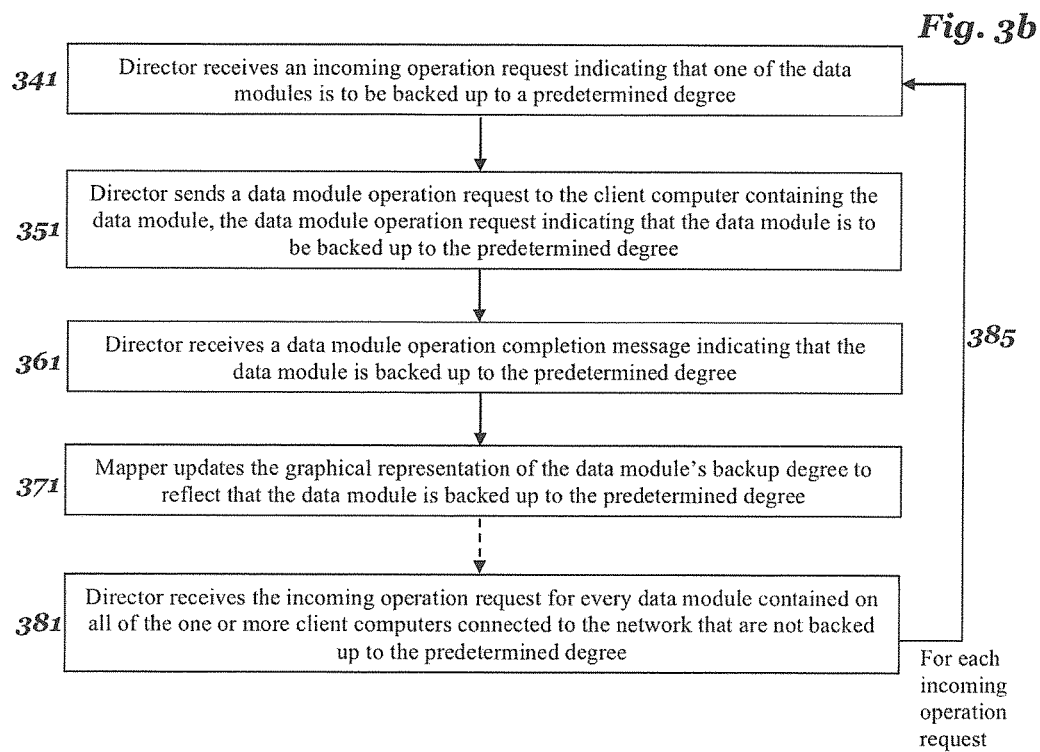
FIG. 3b is a flow chart of one embodiment of a process for directing a backup operation to be performed over one or more data modules by the backup system.

FIG. 3*b* is a flow chart of one embodiment of a process for directing a backup operation to be performed over one or more data modules by the backup system 213. The graphical map creation process begins with the director 225 receiving an incoming operation request indicating that one of the data modules is to be backed up to a predetermined degree (Block 341). In one embodiment, the predetermined degree is 100%, so that once the data module is backed up to the predetermined degree, the data module is fully backed up. In another embodiment, the predetermined degree can be lower than 100%. If this is the case, the incoming operation request can specify that the backup of the data module must stop at the predetermined degree, or it alternately can specify that the predetermined degree is a minimum acceptable degree of backup and that the backup can continue after reaching the predetermined degree.

In one embodiment, this incoming operation request originates from the management console 111. The incoming operation request can specifically be the result of a user interface interaction on the management console 111. In one embodiment, the graphical map 401 can contain a button next to the graphical representation of a data module, and can send the incoming operation request when the button is clicked. In an alternate embodiment, the button can be replaced by a pull-down menu option, such as from a right click menu. In another alternate embodiment, the user interface interaction can be text-based, as in a command line console, or can be the result of some other menu, button, radio button, check box, or similar user interface module. In other embodiments, the incoming operation request originates instead from the backup storage node 127, one of the client computers 123, or an internal hardware or software module within the main server 101, such as an automated timer module.

As previously noted, in some embodiments, the profiler 221 will have gathered additional client computer information from the information messages described in FIG. 3*a*, and as used by the mapper in Block 325 and Block 327. If the additional client computer information is available either through the profile information store 227 or the generated graphical map 401, then the incoming operation request of Block 341 can also direct that an operation be performed relating to one or more of the additional client computer information categories. In one embodiment, the incoming operation request can direct that a client computer backup software be installed or that the installation be repaired. In another embodiment, the incoming operation request can direct that a client computer backup software be upgraded or downgraded to a predetermined version of the client computer backup software. In another embodiment, the incoming operation request can direct that a client computer be configured in some manner so that the client computer backup software can properly function. If the additional client computer information includes other categories of information, then the incoming operation request can also request operations related to those categories. In some embodiments, the incoming operation request directs only a backup operation or an operation relating to one or more additional client computer information categories. In other embodiments, the incoming operation request can direct both a backup operation and an operation relating to one or more additional client computer information categories.

The backup operation process continues with the director sends a data module operation request to the client computer containing the data module, the data module operation request indicating that the data module is to be backed up to the predetermined degree (Block 351). In one embodiment, the predetermined degree is 100%, so that once the data module is backed up to the predetermined degree, the data module is fully backed up. In another embodiment, the predetermined degree can be lower than 100%. If this is the case, the data module operation request can specify that the backup of the data module must stop at the predetermined degree, or it alternately can specify that the predetermined degree is a minimum acceptable degree of backup and that the backup can continue after reaching the predetermined degree.

As previously noted, in some embodiments, the incoming operation request can also direct that an operation be performed relating to one or more of the additional client computer information categories. If this is the case, then the data module operation request can also include a client computer operation request, the client computer operation request indicating that an operation relating to the client computer's additional client computer information is to be performed. In one embodiment, the client computer operation request can direct that a client computer backup software be installed or that the installation be repaired. In another embodiment, the client computer operation request can direct that a client computer backup software be upgraded or downgraded to a predetermined version of the client computer backup software. In another embodiment, the client computer operation request can direct that a client computer be configured in some manner so that the client computer backup software can properly function. If the additional client computer information includes other categories of information, then the client computer operation request can also request operations related to those categories.

In some embodiments, the backup operation process then continues with the director receiving a data module operation completion message indicating that the data module is backed up to the predetermined degree (Block 361). In one embodiment, the origin of this data module operation completion message is the client computer that received the data module operation request.

If the data module operation request included a client computer operation request, the director can also receive a client computer operation completion message indicating that the operation relating to the client computer's additional client computer information has been performed. In one embodiment, the client computer operation completion message is received alongside or as part of the data module operation completion message. In another embodiment, these are received separately, if, for instance, the data module operation completes at a different time than the client computer operation completes.

In some embodiments, the director 225 never receives a data module operation completion message indicating that the data module is backed up to the predetermined degree.

In some embodiments, the backup operation process then continues with the mapper 223 updating the graphical representation of the data module's backup degree to reflect that the data module is backed up to the predetermined degree (Block 371). In some embodiments, the entire graphical map 401 is generated anew during this process. In other embodiments, only the backup degrees that changed during the backup operation process are updated and the remainder of the graphical map 401 is kept the same.

As previously noted, in some embodiments, the director 225 also receives a client computer operation completion message during the process of Block 361. If this is the case, then the mapper 223 can also update the graphical representation of the client computer's additional client computer information to reflect that the operation relating to the client computer's additional client computer information has been performed.

In some embodiments, the mapper 223 does not update the graphical map 401 once it is generated.

In some embodiments, the backup operation process then continues with the director receiving the incoming operation request for every data module contained on all of the one or more client computers connected to the network that are not backed up to the predetermined degree (Block 381). In one embodiment, these incoming operation requests are received sequentially one after the other. In another embodiment, these incoming operation requests are all received in parallel, or substantially concurrently in a cluster. In another embodiment, this cluster of incoming operation requests are sent as one larger incoming operation request indicating that every data module contained on all of the one or more client computers connected to the network that is not backed up to the predetermined degree is to be backed up to the predetermined degree. All of these embodiments can be treated the same way. While FIG. 3b (particularly the arrow 385) illustrates the backup system receiving the incoming operation requests and performing them in sequence, these can alternately be performed concurrently.

In some embodiments, the incoming operation request or requests may indicate that the backup operation or operation relating to the additional client computer information is to be performed over the set of all client computers connected to the network that are not backed up to the predetermined degree. In some embodiments, the director 225 can receive incoming operation requests for only a subset of the set of all client computers connected to the network that are not backed up to the predetermined degree. In other embodiments, the director 225 is prohibited from receive incoming operation requests at all, or is limited from receiving more than a predetermined number of incoming operation requests at a time.

In one embodiment, these incoming operation request or requests originate from the management console 111. The incoming operation requests can specifically be the result of a user interface interaction on the management console 111. In one embodiment, the graphical map 401 can contain a button next to the graphical map 401, and can send the incoming operation requests when the button is clicked. In an alternate embodiment, the button can be replaced by a pull-down menu option, such as from a right click menu. In another alternate embodiment, the user interface interaction can be text-based, as in a command line console, or can be the result of some other menu, button, radio button, check box, or similar user interface module. In other embodiments, the incoming operation requests originate instead from the backup storage node 127, one of the client computers 123, or an internal hardware or software module within the main server 101, such as an automated timer module.

The flow diagram of FIG. 3b illustrates one embodiment the process of the director 225 receiving an incoming operation request relating to a backup operation, having that backup operation performed, and having the mapper update the graphical representation of relevant data modules' backup degrees. However, in an alternate embodiment, the incoming operation request may indicate instead or additionally that an operation relating to one or more categories of additional client computer information is to be performed over one of the client computers (analogous to Block 341). For example, the incoming operation request can direct that a client computer backup software be installed or that the installation be repaired, or that a client computer backup software be upgraded or downgraded to a predetermined version of the client computer backup software, or that a client computer be configured in some manner so that the client computer backup software can properly function. The director then sends a client computer operation request to the client computer described by the additional client computer information, the client computer operation request indicating that the operation relating to the additional client computer information is to be performed over the client computer (analogous to Block 351). In some embodiments, the director 225 can then receive a client computer operation completion message indicating that the operation relating to the additional client computer information has been performed over the client computer (analogous to Block 361). In some embodiments, the mapper 223 can then update the graphical representation of the client computer's additional client computer information to reflect that the operation relating to the additional client computer information has been performed over the client computer (analogous to Block 371). In some embodiments, the director 227 receives the incoming operation request for every client computer connected to the network that does not match a predetermined standard set for the particular category of the additional client computer information in which the operation was requested (analogous to Block 381). The origins of incoming operation requests relating to additional client computer information can be one of the machines that may be the origins of incoming operation requests relating to backup operations. Likewise, multiple incoming operation requests relating to additional client computer information can be treated the same way as multiple incoming operation requests relating to backup operations. In some embodiments, incoming operation requests relating to additional client computer information are sent and considered separately from incoming operation requests relating to backup operations. In other embodiment, they may be sent or considered together.

While the flow diagrams in FIG. 3a and FIG. 3b show a particular order of operations performed by certain embodiments of the invention, it should be understood that such order is exemplary (e.g., alternative embodiments can perform the operations in a different order, combine certain operations, overlap certain operations, etc.).

Figure 4A:
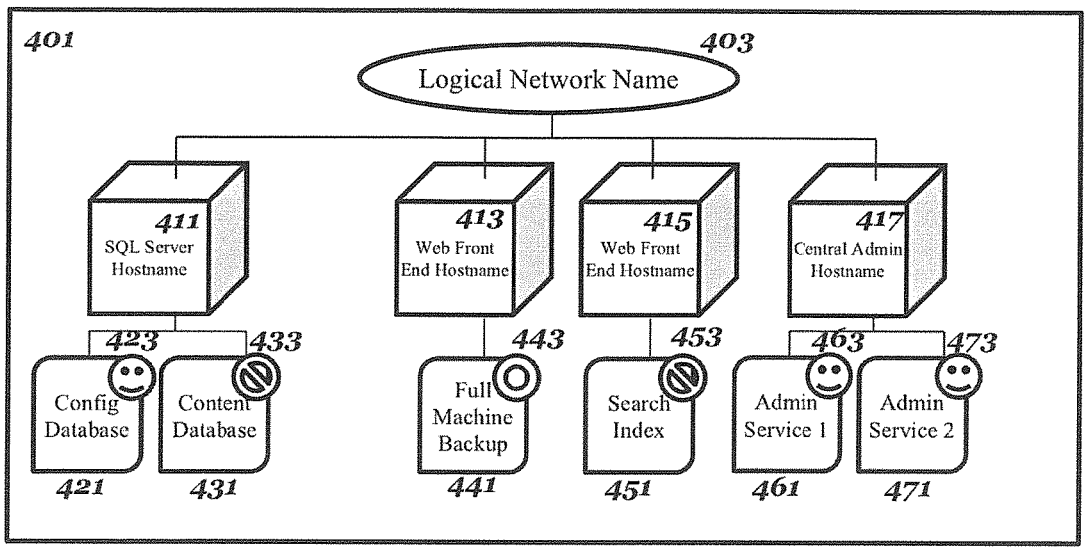
FIG. 4a is one embodiment of the graphical map wherein the graphical representation of each data module's backup degree is displayed as one of a collection of status icons, wherein each status icon represents a predetermined degree to which the data module is backed up.
Figure 5A:
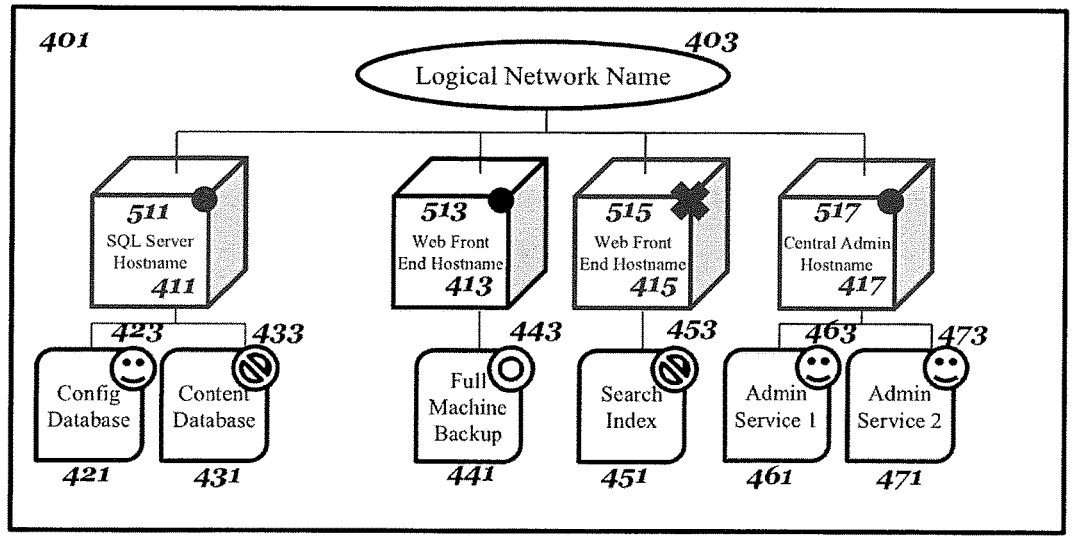
FIG. 5a is one embodiment of the graphical map of FIG. 4a, wherein the graphical representation of the additional client computer information is displayed as an overlaid status icon.
Figure 5B:
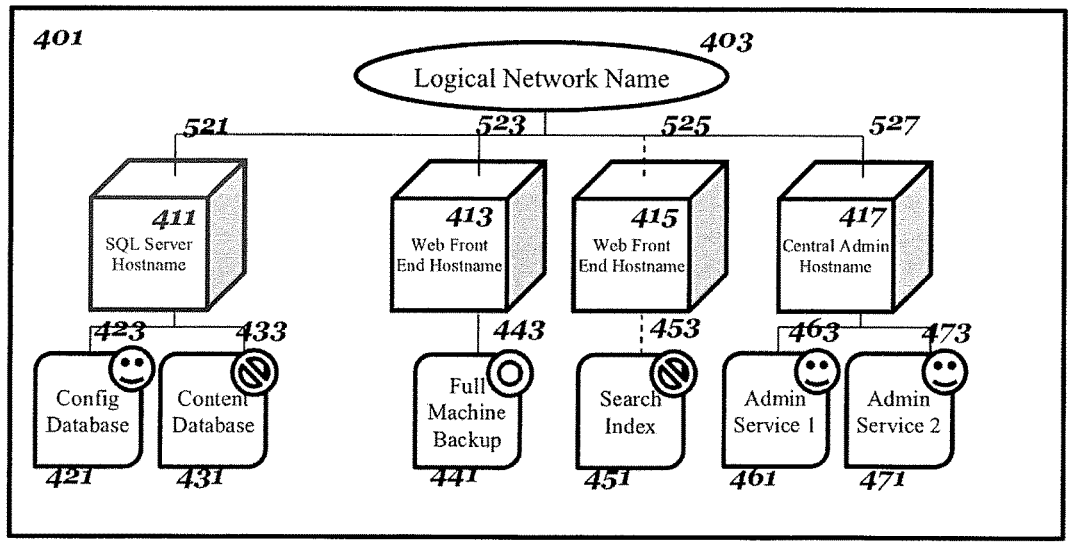
FIG. 5b is one embodiment of the graphical map of FIG. 4a, wherein the graphical representation of the additional client computer information is displayed by modifying the graphical representation of the client computer's connection to the network.

FIG. 4a is one embodiment of the graphical map 401 wherein the graphical representation of each data module's backup degree is displayed as one of a collection of status icons, wherein each status icon represents a predetermined degree to which the data module is backed up.

In one embodiment, the graphical map 401 displays a graphical representation 403 of the network 121 including a logical network name identifying the network 121. This is the case with the embodiments pictured in FIGS. 4a, 4b, 4c, 4d, 5a, and 5b. In one embodiment, the graphical map 401 can further include graphical representations of the client computers 123. In FIGS. 4a, 4b, 4c, 4d, 5a, and 5b, the nodes 411, 413, 415, and 417 are graphical representations of the client computers 123 attached to an exemplary network identified by the logical network name in node 403. In one embodiment, the graphical map 401 can further include graphical representations of the data modules 125 contained by the client computers 123. In FIGS. 4a, 4b, 4c, 4d, 5a, and 5b the nodes 421, 431, 441, 451, 461, and 471 are graphical representations of the data modules 125 contained by the client computers 123. In the embodiments pictured in FIGS. 4a, 4b, 4c, 4d, 5a, and 5b, each of the graphical representations of the data modules 125 is graphically correlated to the graphical representations of the client computers that contain them.

In the embodiments pictured in FIGS. 4a, 4b, 4c, 4d, 5a, and 5b, the graphical representation of each data module's backup degree is graphically correlated with the graphical representation of the data module that it describes, by overlaying the graphical representation of each data module's backup degree over the graphical representation of the data module that it describes. In other embodiments (not illustrated in figures), this graphical correlation can take the form of one graphical representation displayed next to the other graphical representation, a line or arrow or shape linking the two graphical representations, a footnote or footnote-like icon linking one graphical representation to another that is displayed elsewhere, text denoting a correlation between one graphical representation and the other, or any other graphical manner of correlating one graphical representation with another graphical representation.

In FIG. 4a, the graphical representation of each data module's backup degree is displayed as one of a collection of status icons, specifically icons 423, 433, 443, 453, 463, and 473. Status icon 423 is graphically correlated with the data module graphical representation 421. Status icon 433 is graphically correlated with the data module graphical representation 431. Status icon 443 is graphically correlated with the data module graphical representation 441. Status icon 453 is graphically correlated with the data module graphical representation 451. Status icon 463 is graphically correlated with the data module graphical representation 461. Status icon 473 is graphically correlated with the data module graphical representation 471.

In FIG. 4a, each status icon represents a predetermined degree to which the data module is backed up. In one embodiment, there can be three predetermined degrees. For instance, in FIG. 4a, a smiley face icon, such as icons 423, 463, and 473, can indicate that the corresponding data module is mostly backed up. A circle icon, such as icon 443, can indicate that the corresponding data module is partially but not mostly backed up. A crossed out circle icon, such as icons 433 and 453, can indicate that the corresponding data module is not backed up at all, or only backed up a very small amount. In other embodiments, different icons can be used, icons can have different meanings, and a different number of icons can be used.

Figure 4B:
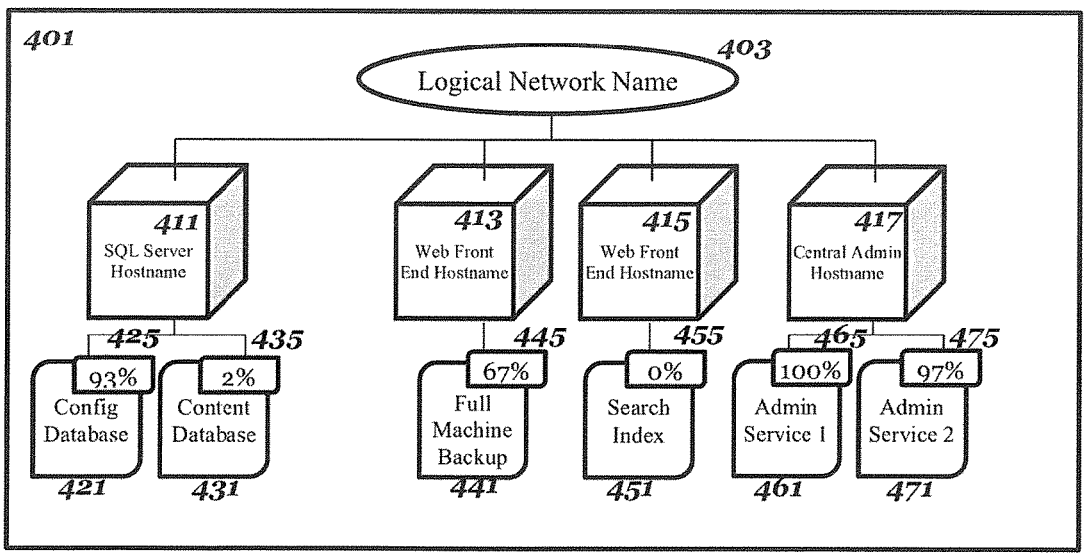
FIG. 4b is one embodiment of the graphical map wherein the graphical representation of each data module's backup degree is displayed as an overlaid percentage of the degree to which the data module is backed up.

FIG. 4b is one embodiment of the graphical map 401 wherein the graphical representation of each data module's backup degree is displayed as an overlaid percentage of the degree to which the data module is backed up.

Percentage 425 is graphically correlated with the data module graphical representation 421. Percentage 435 is graphically correlated with the data module graphical representation 431. Percentage 445 is graphically correlated with the data module graphical representation 441. Percentage 455 is graphically correlated with the data module graphical representation 451. Percentage 465 is graphically correlated with the data module graphical representation 461. Percentage 475 is graphically correlated with the data module graphical representation 471.

Figure 4C:
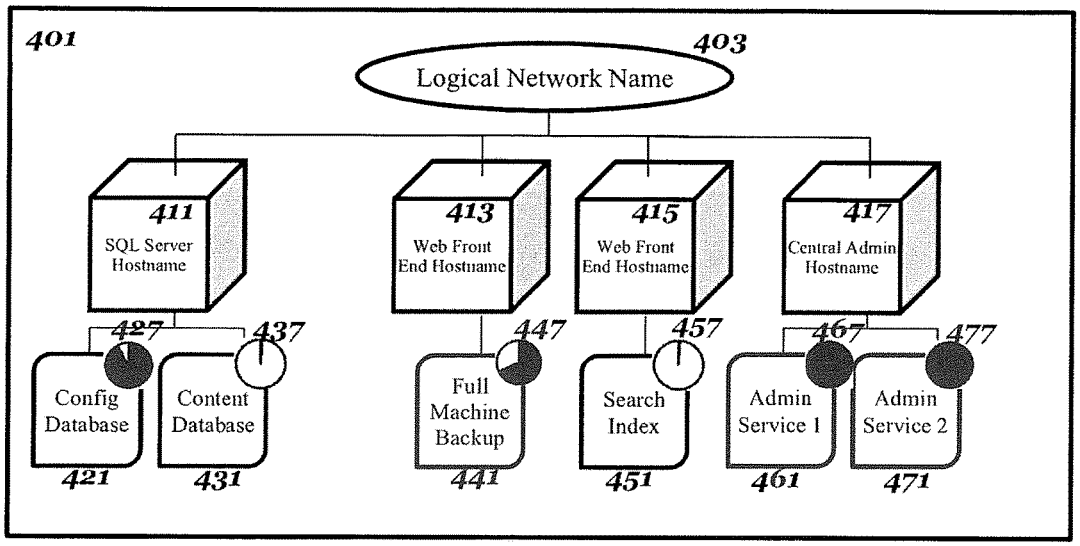
FIG. 4c is one embodiment of the graphical map wherein the graphical representation of each data module's backup degree is displayed as an overlaid pie graph of the degree to which the data module is backed up.

FIG. 4c is one embodiment of the graphical map 401 wherein the graphical representation of each data module's backup degree is displayed as an overlaid pie graph of the degree to which the data module is backed up.

Pie chart 427 is graphically correlated with the data module graphical representation 421. Pie chart 437 is graphically correlated with the data module graphical representation 431. Pie chart 447 is graphically correlated with the data module graphical representation 441. Pie chart 457 is graphically correlated with the data module graphical representation 451. Pie chart 467 is graphically correlated with the data module graphical representation 461. Pie chart 477 is graphically correlated with the data module graphical representation 471.

In one embodiment, a pie chart can use a darker color to include the backup degree in a similar manner as the percentage of FIG. 4b. In another embodiment, it can instead use a lighter color. In one embodiment, the pie charts can be two dimensional. In another embodiment, they can be three dimensional. In this sense, the pie charts of FIG. 4c are merely intended to be illustrative, and not limitations.

Figure 4D:
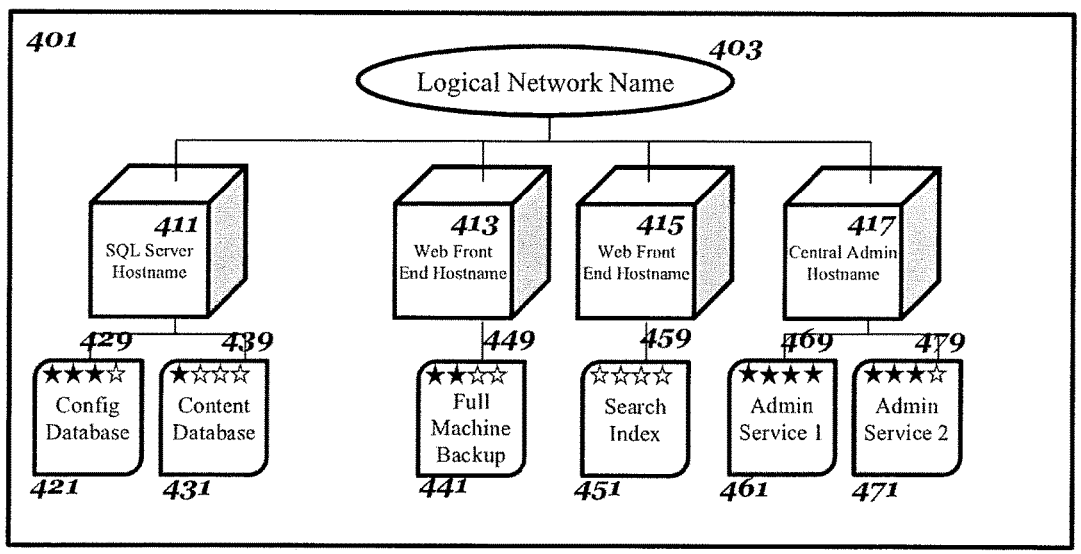
FIG. 4d is one embodiment of the graphical map wherein the graphical representation of each data module's backup degree is displayed as an overlaid rating along a predetermined minimum and maximum rating continuum, the rating representing the degree to which the data module is backed up.

FIG. 4d is one embodiment of the graphical map 401 wherein the graphical representation of each data module's backup degree is displayed as an overlaid rating along a predetermined minimum and maximum rating continuum, the rating representing the degree to which the data module is backed up.

Rating 429 is graphically correlated with the data module graphical representation 421. Rating 439 is graphically correlated with the data module graphical representation 431. Rating 449 is graphically correlated with the data module graphical representation 441. Rating 459 is graphically correlated with the data module graphical representation 451. Rating 469 is graphically correlated with the data module graphical representation 461. Rating 479 is graphically correlated with the data module graphical representation 471.

In one embodiment, a rating system can use stars. In one embodiment, darker stars can indicate each data module's backup degree in a similar manner as the pie chart, but in increments. In another embodiment, the darker and lighter stars can have their roles reversed. In another embodiment, a different shape, such as hearts, diamonds, circles, squares, or triangles, can be used. In another embodiment, a numerical rating can be used. Such a numerical rating can include decimals or fractions, and can be over a range of numbers (e.g., a 1-to-5 rating, or a 1-to-100 rating). In another embodiment, the rating can be displayed in the form of a bar graph, allowing for a similar graphical representation as the stars in FIG. 4d, but along a more continuous continuum.

FIG. 5a is one embodiment of the graphical map 401 of FIG. 4a, wherein the graphical representation of the additional client computer information is displayed as an overlaid status icon. This can be the result of the profiler 221 receiving an information message from a client computer that includes additional client computer information, as previously mentioned in regards to Block 311 of FIG. 3a.

In the embodiment pictured in FIG. 5a, the graphical representation of each client computer's additional client computer information is graphically correlated with the graphical representation of the client computer that it describes, by overlaying the graphical representation of each client computer's additional client computer information over the graphical representation of the client computer that it describes. In other embodiments (not illustrated in figures), this graphical correlation can take the form of one graphical representation displayed next to the other graphical representation, a line or arrow or shape linking the two graphical representations, a footnote or footnote-like icon linking one graphical representation to another that is displayed elsewhere, text denoting a correlation between one graphical representation and the other, or any other graphical manner of correlating one graphical representation with another graphical representation.

In FIG. 5a, the graphical representation of each client computer's additional client computer information is displayed as one of a collection of dark status icons, specifically icons 511, 513, 515, and 517. Status icon 511 is graphically correlated with the client computer graphical representation 411. Status icon 513 is graphically correlated with the client computer graphical representation 413. Status icon 515 is graphically correlated with the client computer graphical representation 415. Status icon 517 is graphically correlated with the client computer graphical representation 417.

In FIG. 5a, each dark status icon represents a possible status or degree of at least one category of additional client computer information. In one embodiment, there can be two predetermined statuses. For instance, in FIG. 5a, a dark circle icon, such as icons 511, 513, and 517, can indicate that the corresponding client computer has its client computer backup software properly installed, while a dark "X" icon, such as icon 515, can indicate that the corresponding client computer does not have its client computer backup software properly installed. In an alternate embodiment, the dark circle icon can indicate that the corresponding client computer is property configured for the client computer backup software to function, while a dark "X" icon can indicate that the corresponding client computer is not property configured for the client computer backup software to function. In an alternate embodiment, the dark circle icon can indicate that the corresponding client computer has a predetermined version of the client computer backup software installed, while a dark "X" icon can indicate that the corresponding client computer does not have a predetermined version of the client computer backup software installed. In other embodiments, different icons can be used, icons can have different meanings, and a different number of icons can be used.

FIG. 5b is one embodiment of the graphical map 401 of FIG. 4a, wherein the graphical representation of the additional client computer information is displayed by modifying the graphical representation of the client computer's connection to the network. In FIG. 5b, there is a dotted line 525 connecting the graphical representation of the network 403 to the graphical representation of client computer 415 ("Web Front End"). The dotted line 525 continues, also connecting the graphical representation of client computer 415 ("Web Front End") to the graphical representation of its data node 451 ("Search Index"). The graphical representations of the other computers in the graphical map 401 are connected to the graphical representation of the network 403 and the graphical representations of their data modules with solid lines (see lines 521, 523, and 527).

In one embodiment, the dotted line 525 represents that the client computer represented by the graphical representation 415 ("Web Front End") does not have its client computer backup software properly installed, while the other client computers do. In another embodiment, the dotted line 525 represents that the client computer represented by the graphical representation 415 ("Web Front End") is not property configured for the client computer backup software to function, while the other client computers are. In another embodiment, the dotted line 525 represents that the client computer represented by the graphical representation 415 ("Web Front End") does not have a predetermined version of the client computer backup software installed, while the other client computers do. In other embodiments, different types of lines can be used, more variety of dotted or embossed lines can be used to represent different categories of additional client computer information, different lines can have different meanings, and different graphical correlations other than lines can be used.

The various embodiments of the graphical map 401 depicted in FIGS. 4a, 4b, 4c, 4d, 5a, and 5b to be regarded in an illustrative rather than a restrictive sense. The graphical representations in each of the figures are exemplary and not intended as a requirement for every graphical map 401. Various modifications and changes can be made to the embodiments without departing from the broader spirit and scope of the invention as set forth in the appended claims.

FIG. 6a is one embodiment of the profile information store 227 that does not include additional client computer information. The profile information store 227 is used by the profiler 221 when it receives an information message from each client computer of the one or more client computers 123 during the process described by Block 311 of FIG. 3a. In one embodiment, the data from these information messages can be stored in a structure that includes a "Data Module Name" column 603 that stores data identifying the data module that is the subject of the information message, a "Backup Degree" column 605 that stores data listing the backup degree of the data module, and a "Client Computer Name" column 601 identifying the client computer that contains the data module.

FIG. 6b is one embodiment of the profile information store 227 that includes additional client computer information. As previously noted, in some embodiments, the profiler 221 also gathers additional client computer information from these information messages, and also stores it in the profile information store 227 during the process described by Block 311 of FIG. 3a. One embodiment of the profile information store 227 including this information is depicted in FIG. 6b, with the additional client computer information located under an "Additional Client Computer Information" column 631. This column is then split into separate columns representing three categories of additional client computer information.

In one embodiment, the "Additional Client Computer Information" column 631 includes a "Client backup service properly installed?" sub-column 621 that identifies if the client computer identified under the "Client Computer Name" column 611 has the client backup service properly installed or not. In one embodiment, the "Additional Client Computer Information" column 631 includes a "Client computer properly configured for client backup service to function?" sub-column 621 that identifies if the client computer identified under the "Client Computer Name" column 611 is properly configured for client backup service to function or not. In one embodiment, the "Additional Client Computer Information" column 631 includes a "Server backup software version" sub-column 621 that identifies what version, if any, of the client backup service is installed on the client computer identified under the "Client Computer Name" column 611. The data from these columns can then be used by the mapper 223 while generating the graphical map 401, as exemplified in FIG. 5a and FIG. 5b.

The embodiments of the profile information store 227 depicted in FIG. 6a and FIG. 6b are to be regarded in an illustrative rather than a restrictive sense. The graphical representations in each of the figures are exemplary (and match up with the examples illustrated in FIGS. 4a, 4b, 4c, 4d, 5a, and 5b for ease of understanding) and not intended as a requirement for every embodiment of the profile information store 227. Various modifications and changes can be made to the embodiments without departing from the broader spirit and scope of the invention as set forth in the appended claims.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable)

medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing specification, embodiments of the invention have been described with reference to specific exemplary embodiments thereof. It will be evident that various modifications can be made thereto without departing from the broader spirit and scope of the invention as set forth in the following claims. The specification and drawings are, accordingly, to be regarded in an illustrative sense rather than a restrictive sense.

What is claimed is:

1. A method for organizing information about one or more client computers connected to a network, wherein each client computer contains one or more data modules, the method comprising:

sending, by a profiler executed by a processor, an information request to each client computer of the one or more client computers, the information request requesting a backup degree for each data module of the one or more data modules on the client computer, the backup degree describing at least an amount of data associated with a data module currently stored in the client computer that has been backed up to a backup node, wherein the backup node is separated from the client computer, wherein each data module describes one or more data files or data file locations;

receiving, by the profiler, an information message from each client computer of the one or more client computers, wherein each information message contains the backup degree for each data module of the one or more data modules on the client computer;

storing, by the profiler information contained in the information message in a profile information store, wherein the profile information store comprises a plurality of entries, each entry corresponding to one of a plurality of client computer identifiers, one or more data module identifiers associated with each client computer identifier, and a backup degree associated with each data module identifier;

generating a single graphical map by a mapper executed by the processor, wherein the single graphical map includes a first graphical representation of each of the one or more client computers, a second graphical representation of each of the one or more data modules on each client computer, and a third graphical representation of each data module's backup degree, wherein the third graphical representation of each data module's backup degree is graphically correlated to the second graphical representation of the data module that the backup degree describes, and wherein the third graphical representation of each data module's backup degree graphically indicates a proportional amount of data associated with the data module that has been backed up to the backup node, wherein the single graphical map also includes a fourth graphical representation of one of a total degree of backup or an average degree of backup of all of the data modules contained on all of the one or more client computers connected to the network; and displaying the single graphical map on a display device.

2. The method of claim 1, wherein the third graphical representation of the data module's backup degree is displayed as one of a collection of status icons, wherein each status icon in the collection of status icons represents a predetermined degree, or range of degrees, to which the corresponding data module is backed up.

3. The method of claim 1, wherein the third graphical representation of the data module's backup degree is displayed as one of a percentage number, a pie chart, a color along a spectrum of colors, a bar graph, a rating along a predetermined minimum and maximum rating continuum, text, or any other numerical or graphical representation of the degree to which the corresponding data module is backed up.

4. The method of claim 1, wherein each information message contains additional client computer information regarding one of whether a client backup service is properly installed on the client computer, whether the client computer is properly configured for the client backup service to function, or whether the client backup service is updated to a predetermined version, the method further comprising:
graphically correlating, for each client computer of the one or more client computers, a graphical representation of the additional client computer information to the graphical representation of the client computer.

5. The method of claim 1, where the one or more client computers work in concert to support an application that runs on the Internet or that runs on an intranet.

6. The method of claim 1, further comprising:
receiving an incoming operation request indicating that one of the data modules is to be backed up to a predetermined degree; and
sending a data module operation request to the client computer containing the data module, the data module operation request indicating that the data module is to be backed up to the predetermined degree.

7. The method of claim 6, further comprising:
receiving a data module operation completion message indicating that the data module is backed up to the predetermined degree; and
updating the graphical representation of the data module's backup degree to reflect that the data module is backed up to the predetermined degree.

8. The method of claim 6, further comprising:
receiving the incoming operation request for every data module contained on all of the one or more client computers connected to the network that are not backed up to the predetermined degree.

9. The method of claim 1, wherein each entry further comprises one or more client computer information items, the one or more client computer information items indicating whether a client computer backup service is properly installed, whether the client computer is properly configured, and the client computer's backup service version.

10. A system for organizing information about one or more client computers in a network, wherein each client computer contains one or more data modules, the system comprising:
a network interface;
a memory; and
a processor, the processor coupled to the memory and the network interface, wherein the processor is configured to execute a profiler, wherein the profiler is configured to
send an information request to each client computer of the one or more client computers in a network, the information request requesting a backup degree for each data module of the one or more data modules on the client computer, the backup degree describing at least an amount of data associated with a data module currently stored in the client computer that has been backed up to a backup node, wherein the backup node is separated from the client computer, wherein each data module describes one or more data files or data file locations,
receive an information message from each client computer of the one or more client computers, wherein each information message contains the backup degree for each data module of the one or more data modules on the client computer, and
storing information contained in the information message in a profile information store, wherein the profile information store comprises a plurality of entries, each entry corresponding to one of a plurality of client computer identifiers, one or more data module identifiers associated with each client computer identifier, and a backup degree associated with each data module identifier, and
wherein the processor is also configured to execute a mapper, wherein the mapper is configured to generate a single graphical map to be displayed on a display device, wherein the single graphical map includes a first graphical representation of each of the one or more client computers, a second graphical representation of each of the one or more data modules on each client computer, and a third graphical representation of each data module's backup degree, wherein the third graphical representation of each data module's backup degree is graphically correlated to the second graphical representation of the data module that the backup degree describes, and wherein the third graphical representation of each data module's backup degree graphically indicates a proportional amount of data associated with the data module that has been backed up to the backup node, wherein the single graphical map also includes a fourth graphical representation of one of a total degree of backup or an average degree of backup of all of the data modules contained on all of the one or more client computers connected to the network.

11. The system of claim 10, wherein the mapper is further configured to send the single graphical map to be displayed on a management console.

12. The system of claim 10, wherein the mapper is configured to generate the third graphical representation of each data module's backup degree as one of a collection of status icons, wherein each status icon in the collection of status icons represents a predetermined degree, or range of degrees, to which the corresponding data module is backed up.

13. The system of claim 10, wherein the mapper is configured to generate the third graphical representation of each data module's backup degree as one of a percentage number, a pie chart, a color along a spectrum of colors, a bar graph, a rating along a predetermined minimum and maximum rating continuum, text, or any other numerical or graphical representation of the degree to which the corresponding data module is backed up.

14. The system of claim 10, wherein the mapper is configured to include a fourth graphical representation of one of a total degree of backup or an average degree of backup of all of the data modules contained on all of the one or more client computers connected to the network.

15. The system of claim 10, wherein each information message contains additional client computer information regarding one of whether a client backup service is properly installed on the client computer, whether the client computer is properly configured for the client backup service to function, or whether the client backup service is updated to a predetermined version, and wherein the mapper is further configured to graphically correlate a graphical representation of the additional client computer information to the graphical representation of the client computer.

16. The system of claim 10, where the one or more client computers work in concert to support an application that runs on the Internet or that runs on an intranet.

17. The system of claim 10, wherein the processor is configured to execute a director, wherein the director is configured to receive an incoming operation request indicating that one of the data modules is to be backed up to a predetermined degree, and wherein the director is further configured to then send a data module operation request to the client computer that contains the data module, wherein the data module operation request indicates that the data module is to be backed up to the predetermined degree.

18. The system of claim 17, wherein the director is further configured to receive a data module operation completion message indicating that the data module is backed up to the predetermined degree, and further wherein the mapper is configured to update the graphical representation of the data module's backup degree to reflect that the data module is backed up to the predetermined degree.

19. The system of claim 17, wherein the director is further configured to receive the incoming operation request for every data module contained on all of the one or more client computers connected to the network that are not backed up to the predetermined degree.

20. The system of claim 10, wherein each entry further comprises one or more client computer information items, the one or more client computer information items indicating whether a client computer backup service is properly installed, whether the client computer is properly configured, and the client computer's backup service version.

21. A non-transitory machine-readable medium having instructions stored therein, which when executed by a processor, cause the processor to perform operations of organizing information about one or more client computers connected to a network, wherein each client computer contains one or more data modules, the operations comprising:

sending, by a profiler executed by a processor, an information request to each client computer of the one or more client computers, the information request requesting a backup degree for each data module of the one or more data modules on the client computer, the backup degree describing at least an amount of data associated with a data module currently stored in the client computer that has been backed up to a backup node, wherein the backup node is separated from the client computer, wherein each data module describes one or more data files or data file locations;

receiving by the profiler, an information message from each client computer of the one or more client computers, wherein each information message contains the backup degree for each data module of the one or more data modules on the client computer;

storing, by the profiler, information contained in the information message in a profile information store, wherein the profile information store comprises a plurality of entries, each entry corresponding to one of a plurality of client computer identifiers, one or more data module identifiers associated with each client computer identifier, and a backup degree associated with each data module identifier;

generating a single graphical map by a mapper executed by the processor, wherein the single graphical map includes a first graphical representation of each of the one or more client computers, a second graphical representation of each of the one or more data modules on each client computer, and a third graphical representation of each data module's backup degree, wherein the third graphical representation of each data module's backup degree is graphically correlated to the second graphical representation of the data module that the backup degree describes, and wherein the third graphical representation of each data module's backup degree graphically indicates a proportional amount of data associated with the data module that has been backed up to the backup node, wherein the single graphical map also includes a fourth graphical representation of one of a total degree of backup or an average degree of backup of all of the data modules contained on all of the one or more client computers connected to the network; and displaying the single graphical map on a display device.

22. The non-transitory machine-readable medium of claim 21, wherein each entry further comprises one or more client computer information items, the one or more client computer information items indicating whether a client computer backup service is properly installed, whether the client computer is properly configured, and the client computer's backup service version.

* * * * *